United States Patent
Stradinger et al.

(10) Patent No.: US 6,349,424 B1
(45) Date of Patent: Feb. 26, 2002

(54) RINSE FLUID VALVE FOR A VACUUM TOILET

(75) Inventors: Jay D. Stradinger, Roscoe; William Bruce Anderson, Rockford; Mark A. Pondelick; Douglas M. Wallace, both of Roscoe; Michael B. Hancock, Rockford, all of IL (US); Arthur J. McGowan, Jr., Thornton, CO (US); Ian Tinkler, Rockford, IL (US)

(73) Assignee: Evac International Oy (FI)

( * ) Notice: Subject to any disclaimer, the term of this patent is extended or adjusted under 35 U.S.C. 154(b) by 0 days.

(21) Appl. No.: 09/713,872

(22) Filed: Nov. 16, 2000

(51) Int. Cl.[7] .............................................. E03D 11/00
(52) U.S. Cl. ................................. 4/431; 4/378; 4/435
(58) Field of Search ............................. 4/300, 316, 420, 4/431–435, 458, 378; 137/588, 595, 553, 554, 192, 205, 625.31, 625.32, 614.2; 251/16, 25

(56) References Cited

U.S. PATENT DOCUMENTS

| | | | |
|---|---|---|---|
| 3,239,849 A | 3/1966 | Liljendahl | 4/77 |
| 3,922,730 A | 12/1975 | Kemper | 4/10 |
| 3,995,328 A | 12/1976 | Carolan et al. | 4/10 |
| 4,063,315 A | 12/1977 | Carolan et al. | 4/10 |
| 4,184,506 A | 1/1980 | Varis et al. | 137/205 |
| 4,246,925 A | 1/1981 | Oldfelt | 137/205 |
| 4,275,470 A | 6/1981 | Badger et al. | 4/316 |
| 4,357,719 A | 11/1982 | Badger et al. | 4/316 |
| 4,521,925 A | 6/1985 | Chen et al. | 4/362 |
| 4,713,847 A | 12/1987 | Oldfelt et al. | 4/316 |
| 5,007,117 A | 4/1991 | Oldfelt et al. | 4/432 |
| 5,099,867 A * | 3/1992 | Emery | 137/554 |
| 5,133,853 A | 7/1992 | Mattsson et al. | 210/104 |
| 5,604,938 A | 2/1997 | Tyler | 4/321 |
| 5,732,417 A | 3/1998 | Pondelick | 4/427 |
| 6,131,596 A | 10/2000 | Monson | 137/14 |
| 6,152,160 A | 11/2000 | Bowden Wilcox et al. | 137/15.01 |
| 6,202,683 B1 * | 3/2001 | Smith | 137/498 |
| 6,216,285 B1 | 4/2001 | Olin | 4/431 |

FOREIGN PATENT DOCUMENTS

| WO | WO 93/05247 | * 3/1993 | 4/378 |
|---|---|---|---|

\* cited by examiner

*Primary Examiner*—Charles R. Eloshway
*Assistant Examiner*—Tuan Nguyen
(74) *Attorney, Agent, or Firm*—Marshall, Gerstein & Borun (57) ABSTRACT

A rinse fluid valve for use in a vacuum toilet system is disclosed. The vacuum toilet system includes a waste receptacle with a rinse fluid dispenser associated therewith and a source of rinse fluid. The rinse fluid valve has a housing with an inlet in fluid communication with the rinse fluid source and an outlet in fluid communication with the rinse fluid dispenser. A flow path extends from the inlet to the outlet. A moveable rinse fluid valve member is disposed in the flow path and movable between open and closed positions. A fuse valve is disposed in the flow path upstream of the rinse fluid valve and has a normally open position to allow fluid flow therethrough. The fuse valve is actuatable to a closed position after a desired volume of fluid has passed therethrough, thereby to cease rinse fluid flow through the flow path.

18 Claims, 8 Drawing Sheets

RINSE FLUID VALVE FOR A VACUUM TOILET

FIELD OF THE INVENTION

The present invention generally relates to toilets and, more particularly, to vacuum toilet systems.

BACKGROUND OF THE INVENTION

Vacuum toilet systems are generally known in the art for use in both vehicle and stationary applications. A vacuum toilet system typically comprises a bowl for receiving waste having an outlet connected to a vacuum sewer line. A discharge valve is disposed between the bowl outlet and vacuum sewer line to selectively establish fluid communication therebetween. The vacuum sewer line is connected to a collection tank that is placed under partial vacuum pressure by a vacuum source, such as a vacuum blower. When the discharge valve is opened, material in the bowl is transported to the sewer pipe as a result of the pressure difference between the interior of the bowl and the interior of the sewer line. Conventional vacuum toilet systems also include a source of rinse fluid and a rinse fluid valve for controlling introduction of rinse fluid into the bowl.

It is important for a rinse valve fluid to deliver a consistent volume of rinse fluid during each flush cycle, particularly in vehicle applications where the source of rinse fluid and the waste storage capacity are limited. If too little rinse fluid is sent, the bowl will not be sufficiently rinsed. If too much fluid is delivered, the rinse fluid supply is more quickly depleted and the waste storage capacity is reached sooner. Accordingly, the rinse fluid valve should consistently deliver the desired volume of rinse fluid during each flush cycle.

Conventional rinse fluid valves, however, deliver inconsistent volumes of rinse fluid during a flush cycle. A rinse valve is typically provided as an electrically operated valve, such as a solenoid valve. The valve has a normally closed position and is controlled to actuate to an open position for a fixed period of time to allow rinse fluid to flow to the bowl. Thus, the volume of rinse fluid delivered by the rinse fluid valve is dependent on the pressure of the rinse fluid entering the valve, since the open valve period is fixed. Unfortunately, rinse fluid pressure is not always held constant. A system may experience pressure fluctuations during operation, and different systems may provide different rinse fluid pressure levels. As a result, the rinse fluid valves deliver different volumes of rinse fluid according to the rinse fluid pressure.

Furthermore, conventional rinse fluid valves are subject to failure, which may flood the toilet and prematurely deplete the rinse fluid supply. The rinse fluid valve may become stuck in an open position so that rinse fluid is continuously supplied to the toilet bowl. If the valve failure is not detected quickly, the bowl may flood with rinse fluid and overflow.

Still further, conventional vacuum toilets in general and rinse fluid valves in particular are overly difficult and time consuming to maintain. Maintenance concerns are particularly significant in aircraft applications, in which a number of sub-systems are installed on board. According to general practice in the airline industry, each sub-system includes one or more components which must be replaced in the event of failure, such components being commonly referred to as line replaceable units (LRUs). Presently, the entire toilet assembly is defined as the LRU for the vacuum toilet system. As a result, an airline must stock one or more replacement toilets in case of a toilet failure, so that the replacement toilet may be swapped in for the faulty toilet. A "bench test" is then performed on the faulty toilet to determine which components have failed in the toilet. The faulty components are then repaired or replaced (which may include significant disassembly and reassembly of the toilet) so that the toilet may be reused on another aircraft.

Each of the steps performed during a toilet repair is overly difficult and time consuming. To remove an entire toilet assembly from an aircraft requires disassembly of at least four self-locking mounting fasteners, an electrical connection, a grounding strap, a potable water line connection, and a waste discharge pipe connection. Each connection may be difficult to access, and may require a particular tool in order to loosen and disconnect. The same connections must then be reconnected for the replacement toilet.

SUMMARY OF THE INVENTION

In accordance with certain aspects of the present invention, a rinse fluid valve is provided for use in a vacuum toilet system having a waste receptacle with a rinse fluid dispenser associated therewith and a source of rinse fluid. The rinse fluid valve comprises a housing having an inlet in fluid communication with the rinse fluid source and an outlet in fluid communication with the rinse fluid dispenser. A flow path extends from the inlet to the outlet, and a moveable rinse fluid valve member is disposed in the flow path and moveable between open and closed positions. A second valve member is disposed in the flow path upstream of the rinse fluid valve and has a normally open position to allow fluid flow therethrough. The second valve member is actuatable to a closed position after a desired volume of fluid has passed therethrough thereby to cease rinse fluid flow through the flow path.

In accordance with additional aspects of the present invention, a rinse fluid valve is provided for use in a vacuum toilet system having a waste receptacle with a rinse fluid dispenser associated therewith and a source of rinse fluid. The rinse fluid valve comprises a housing having an inlet in fluid communication with the rinse fluid source and an outlet in fluid communication with the rinse fluid dispenser. A flow path extends from the inlet to the outlet, and a moveable rinse fluid valve member is disposed in the flow path and moveable between open and closed positions. A second valve is disposed in the flow path upstream of the rinse fluid valve, the second valve including a second valve member moveable between an open position allowing fluid flow therethrough and a closed position prohibiting fluid flow therethrough. A position sensor is provided for detecting a position of the second valve member and generating a position signal.

In accordance with further aspects of the present invention, a rinse fluid valve is provided for use in a vacuum toilet system having a waste receptacle with a rinse fluid dispenser associated therewith and a source of rinse fluid. The rinse fluid valve comprises a housing having an inlet in fluid communication with the rinse fluid source and an outlet in fluid communication with the rinse fluid dispenser. A flow path extends from the inlet to the outlet, and a moveable rinse fluid valve member is disposed in the flow path having a flow passage extending therethrough. The valve member is moveable between a closed position, in which the flow passage does not communicate with the flow path to prevent fluid flow, and an open position, in which the flow passage is aligned with the flow path to allow fluid flow. A freeze protection valve is formed in the ball valve and has a valve seat and a movable valve member biased away from the valve seat, wherein sufficient fluid flow pressure drives the valve member into engagement with the valve seat.

Other features and advantages are inherent in the apparatus claimed and disclosed or will become apparent to those skilled in the art from the following detailed description and its accompanying drawings.

DETAILED DESCRIPTION OF THE PREFERRED EMBODIMENTS

Figure 1A:
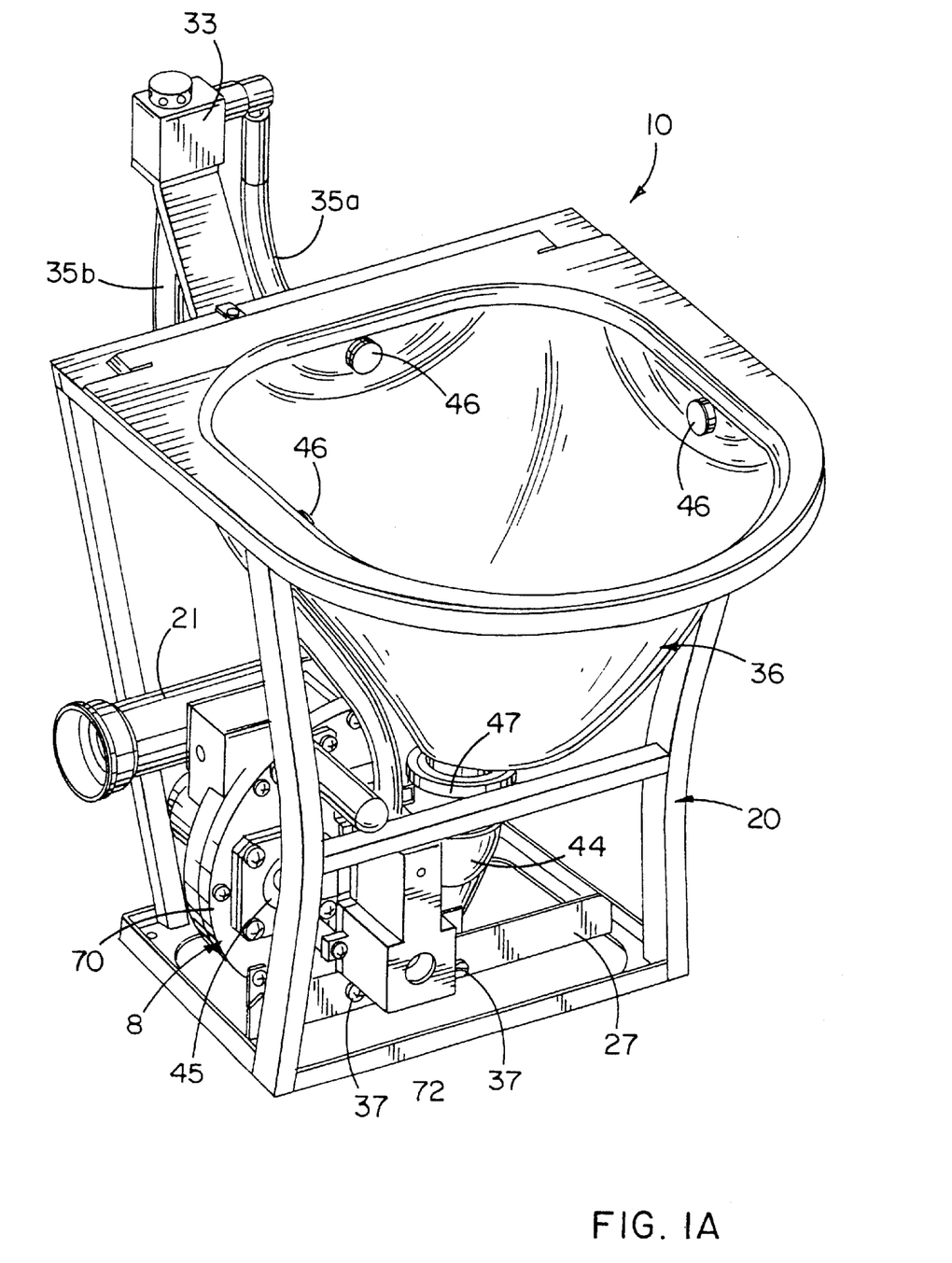
FIGS. 1A and 1B are perspective views of a vacuum toilet incorporating a rinse fluid valve in accordance with the present invention.
Figure 1B:
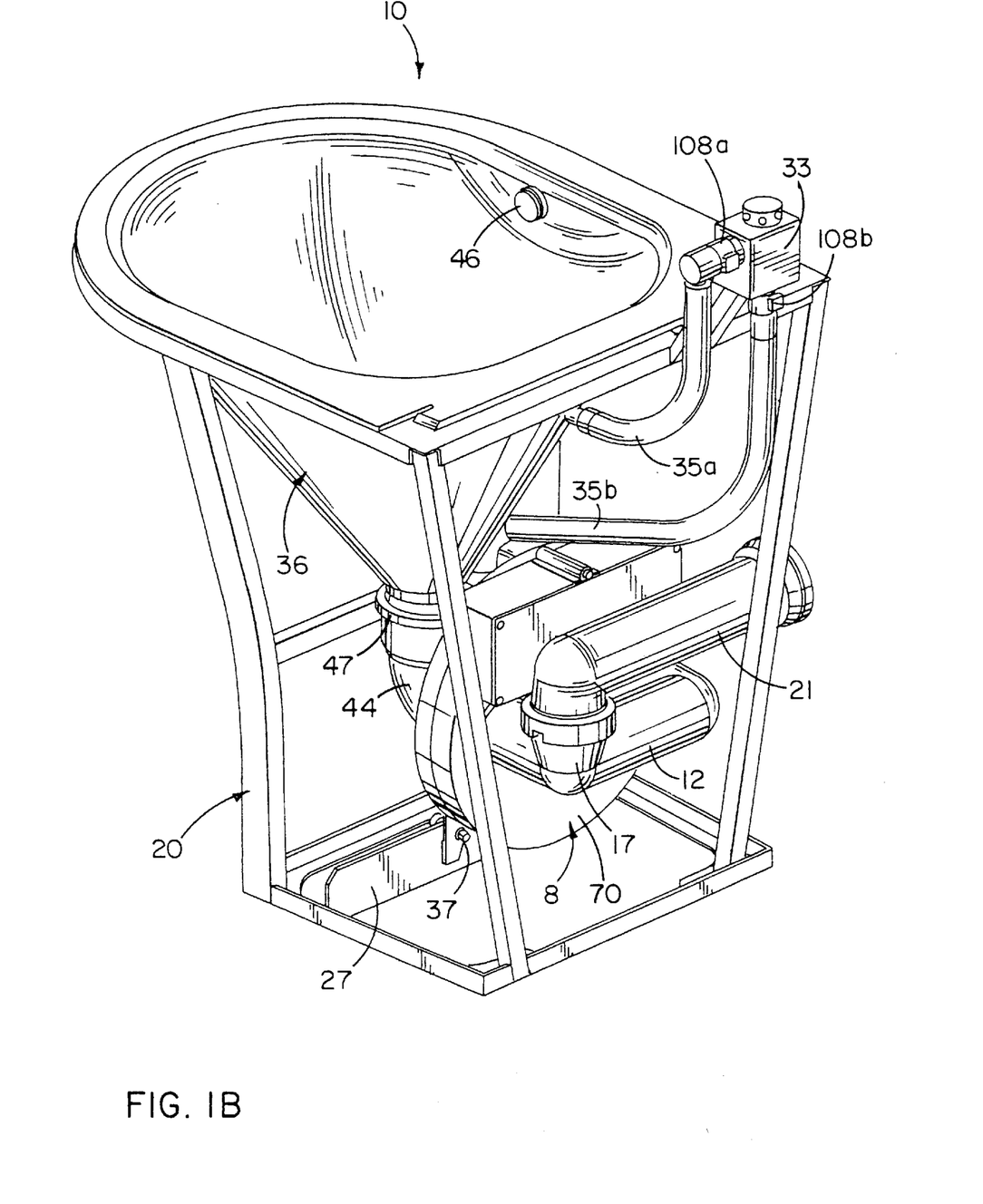
Figure 2:
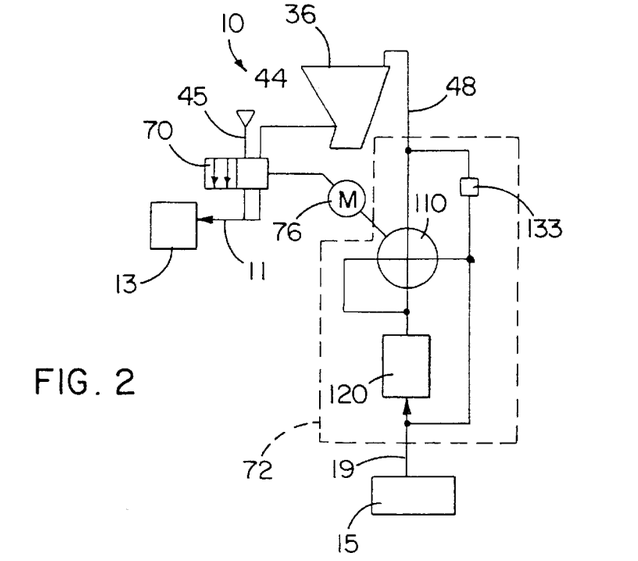
FIG. 2 is a schematic diagram of the vacuum toilet of FIG. 1.

A vacuum toilet 10 is illustrated in FIGS. 1A, 1B, and 2 having a valve set 8 with a rinse fluid valve 72 in accordance with the present invention. The vehicle is provided with a sewer line 1l, a vacuum tank 13 connected to the sewer line 11, and a vacuum source (not shown) for placing the vacuum tank 13 under partial vacuum pressure. The vehicle further includes a source of rinse fluid 15 connected to a rinse fluid supply line 19.

The vacuum toilet 10 includes a bowl 36 for receiving waste material connected to the valve set 8. In the preferred embodiment, the bowl 36 is supported by a frame 20 to form a replaceable bowl assembly, as described in greater detail in commonly owned and co-pending U.S. patent application Ser. No. 09/713,861, entitled "Toilet Bowl Assembly" incorporated herein by reference. The frame 20 preferably includes a bracket 27 adapted to support the valve set 8. The valve set 8 may be attached to the bracket 27 using fasteners that may be manipulated by hand, such as knurled screws 37. At least one rinse fluid dispenser, such as nozzles 46, is provided inside the bowl 36 for directing rinse fluid over the surface of the bowl. A first rinse fluid pipe 35a connects the nozzles 46 to a vacuum breaker 33. A second rinse fluid pipe 35b extends from the vacuum breaker 33 to the valve set 8. Quick-disconnect couplings 108a, 108b are provided to connect the first and second rinse fluid pipes 35a, 35b to the vacuum breaker 33.

Figure 3:
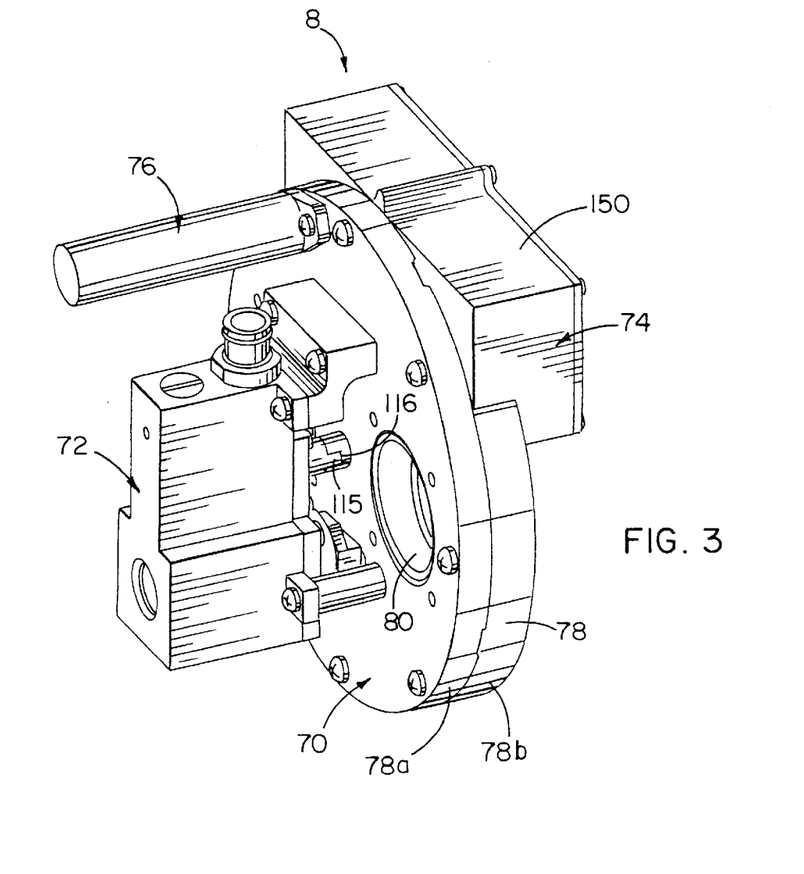
FIG. 3 is an enlarged perspective view of a valve set incorporating the rinse fluid valve.
Figure 4A:
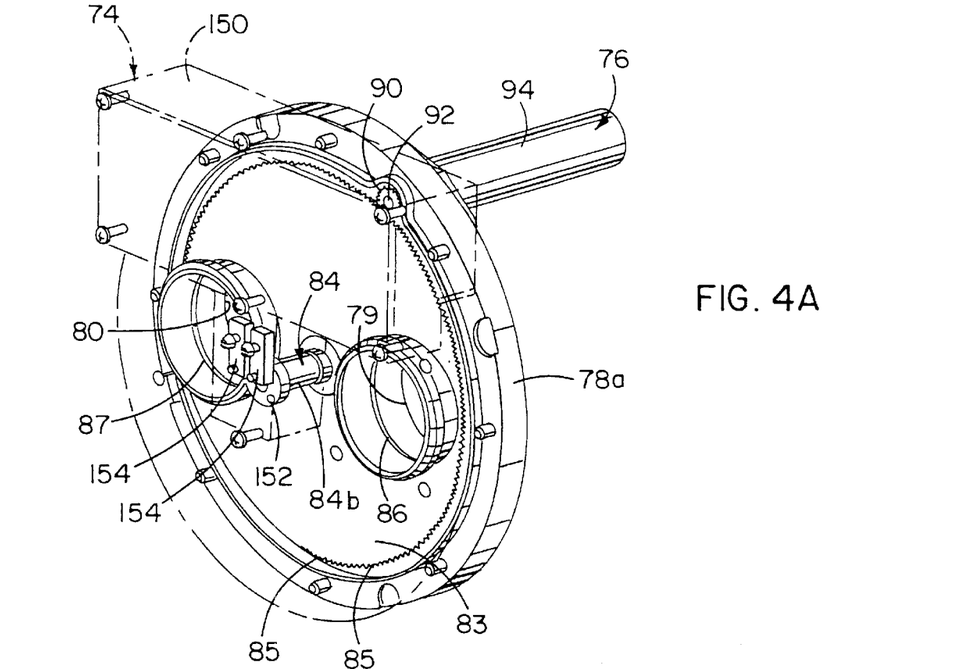
FIG. 4A and 4B are perspective views of a discharge valve and actuator incorporated into the valve set.
Figure 4B:
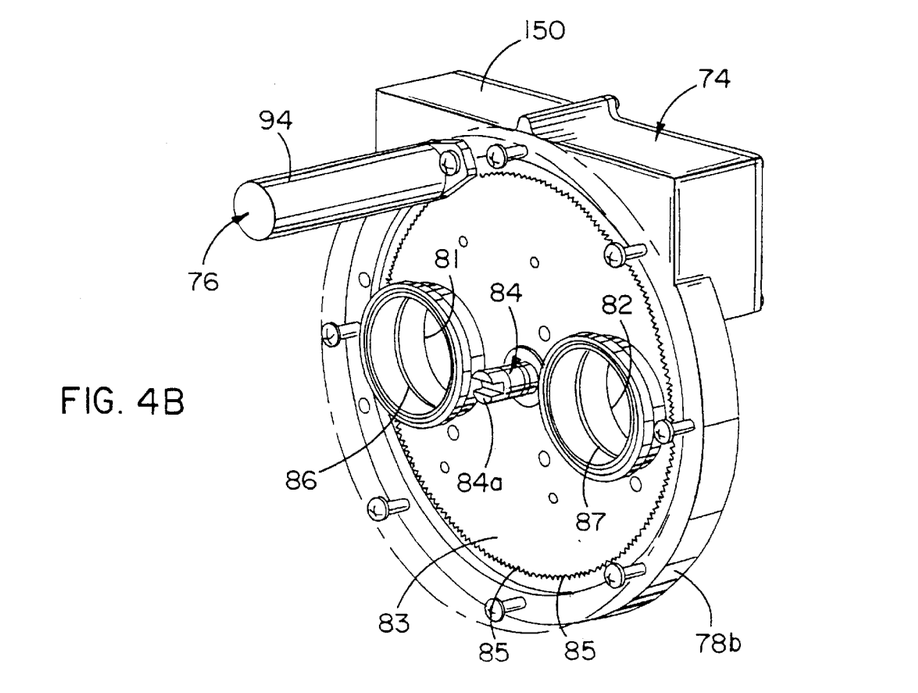

As shown in FIG. 3, the valve set 8 comprises four sub-components: a discharge valve 70, a rinse valve 72, a flush control unit (FCU) 74, and an actuator 76. The discharge valve 70 includes a discharge valve housing 78 divided into two halves 78a, 78b. As best shown in FIGS. 4A and 4B, the housing 78 includes a pair of inlets 79, 80 formed in the housing half 78a aligned with a pair of outlets 81, 82 formed in the housing half 78b.

The housing 78 further defines a chamber for receiving a discharge valve member, such as valve disk 83. An axle 84 is attached to the valve disk 80 and has two ends 84a, 84b. Holes are formed in the housing halves 78a, 78b sized to receive the axle ends 84a, 84b, respectively, so that the disk 83 is supported for rotation about the axle 84. The periphery of the disk 83 is formed with gear teeth 85, and a pair of apertures 86, 87 are formed through the disk 83. The apertures 86, 87 are spaced so that both register simultaneously with the associated inlet/outlet pairs 79/81, 80/82 as the disk 83 rotates. In the illustrated embodiment, the apertures 85, 86 and associated inlet/outlet pairs 79/81, 80/82 are spaced 180 degrees apart.

According to the illustrated embodiment, the inlet 79 is connected to one end of a transfer pipe 44, with the other end of the transfer pipe 44 being attached to an outlet 42 of the bowl 36. In the preferred embodiment, the transfer pipe 44 includes a fitting 47 (FIG. 1A) adapted to frictionally and sealingly engage the bowl outlet 42, so that the transfer pipe 44 may be quickly and easily attached and removed from the bowl outlet 42. An air intake check valve 45 is attached to the other inlet 80, and is oriented to allow fluid flow into the inlet 80 while preventing fluid from discharging out of the check valve 45 (FIGS. 1A and 2). A U-shaped outlet pipe 12 (FIG. 1B) has a first end connected to the outlet 81 and a second end connected to the outlet 82. The outlet pipe 12 further has a branch 17 leading to a discharge pipe 21. In the preferred embodiment, the branch 17 includes a pair of spaced pins and the discharge pipe 21 includes a pair of J-shaped slots positioned to engage the pins, so that the discharge pipe 21 is removably attached to the branch 17. Furthermore, when the pins and J-shaped slots are spaced 180 degrees apart, the discharge pipe 21 may be positioned for either right- or left-handed discharge simply by rotating the discharge pipe 21 before attachment, without requiring changes to the other toilet components. The free end of the discharge pipe 21 is adapted for releasable connection to the sewer line 1, such as with a clam shell coupling (not shown).

In operation, when the disk apertures 86, 87 are aligned with the inlet/outlet pairs 79/81, 80/82, the discharge valve 70 not only transfers waste from the drain pipe 44 to the sewer line 11, but also pulls additional air into the sewer line 11 through the air intake check valve 45. The additional air intake reduces noise that is normally generated during a flush.

The actuator 76 is provided for driving the valve disk 83. As best shown in FIG. 4A, the actuator 76 includes a spur gear 90 enmeshed with the gear teeth 85 formed about the periphery of the disk 83. The spur gear 90 is mounted to a rotatable shaft 92, and a drive is provided for rotating the shaft 92. The FCU 74 is operably coupled to the actuator 76 to control operation of the actuator. According to the illustrated embodiment, the disk 83 may be rotated in a single direction by ninety degree increments to open and close the discharge valve 70. Alternatively, the disk 83 may also be reciprocated back and forth across a ninety degree arc to open and close the valve 70, or the disk 83 may be controlled in other manners according to other disk designs and layouts.

Figure 5:
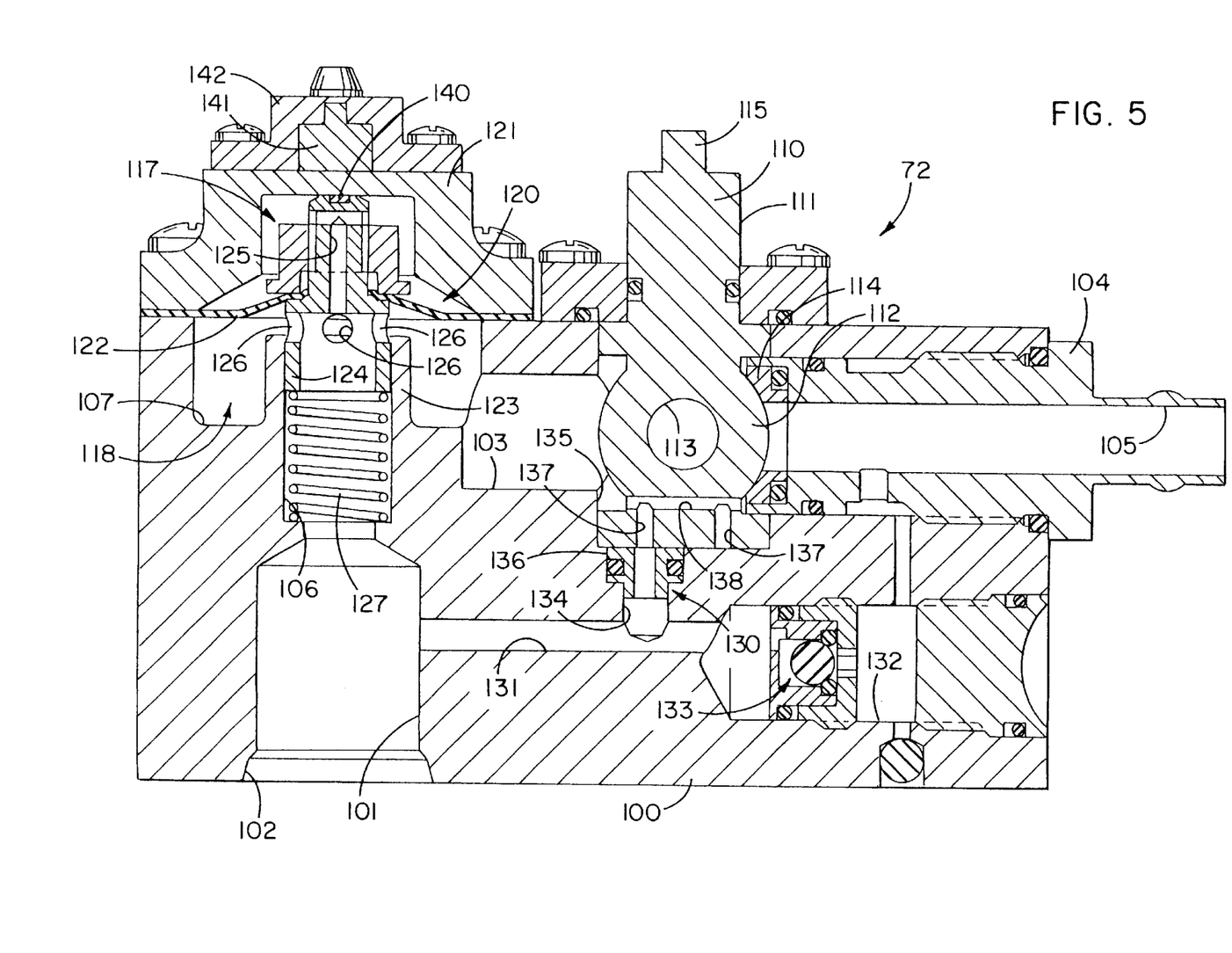
FIG. 5 is a side elevation view, in cross-section, of the rinse fluid valve incorporated into the valve set.

The rinse valve 72 is provided for controlling flow of rinse fluid to the bowl 36. As best shown in FIG. 5, the rinse valve 72 comprises a housing block 100 formed with an inlet bore 101 defining an inlet 102 and an outlet bore 103. The inlet bore 103 is adapted for connection to the rinse fluid line 19 via a quick-disconnect coupling (not shown). An insert 104 is positioned in a downstream portion of the outlet bore 103 and defines an outlet 105. The outlet end of the insert 104 is barbed to secure one end of the second rinse fluid pipe 35b thereto, while the opposite end of the second rinse fluid pipe 35b has the quick-disconnect coupling 108b (FIGS. 1A and 1B). A poppet valve bore 106 is also formed in the housing block 100, and fluidly communicates with the inlet bore 101. An annular recess 107 is formed in the housing block 100 concentric with the poppet valve bore 106 to establish fluid communication between the poppet valve bore 106 and the outlet bore 103.

The rinse valve 72 includes a rinse valve member, such as a ball valve 110, which is disposed in the outlet bore 103 for selectively establishing fluid communication between the outlet bore 103 and the outlet 105. The ball valve 110 includes a shaft 111 and a valve member 112 having a flow passage 113 extending therethrough. A seal 114 is provided downstream of the valve member 112 for preventing leakage between the valve member 112 and the downstream portion of the outlet bore 103. As shown in FIG. 5, the flow passage 113 is perpendicular to the outlet bore 103, thereby preventing fluid flow. The ball valve 110 is rotatable, however, to align the flow passage 113 with the outlet bore 103, thereby establishing fluid communication between the upstream portion of the outlet bore 103 and outlet 105.

The top of the shaft 111 is adapted to mechanically engage the axle end 84a, as best shown in FIG. 3, so that rotation of the disk 83 also rotates the ball valve 110. In the illustrated embodiment, the shaft 111 is formed with a key 115, while the hub end 84a has a slot 116 sized to receive the key 115. As a result, a separate actuator is not required to actuate the ball valve 110, thereby reducing cost and space requirements for the toilet.

The rinse valve 72 further includes a fuse valve 120 for metering rinse fluid flow through the rinse valve when the ball valve 110 is open. As used herein, the phrase "fuse valve" indicates a valve that actuates after a set value of fluid has passed therethrough. As best shown in FIG. 5, a bonnet 121 is attached to the housing block 100 to close off the poppet valve bore 106 and the recess 107. A flexible diaphragm 122 is attached between the housing block 100 and the bonnet 121 to define a pilot chamber 117 above the diaphragm 122 and a flow chamber 118 below the diaphragm 122. As shown in FIG. 5, the diaphragm 122 is in a closed position, in which the diaphragm 122 engages an annular intermediate wall 123 extending between the poppet valve bore 106 and recess 107, thereby closing off fluid communication between the poppet valve bore 106 and recess 107. A poppet valve 124 is disposed inside the poppet valve bore 106 and is attached to the diaphragm 122, so that the poppet valve 124 moves with the diaphragm 122. The top of the poppet valve 124 is formed with a pilot port 125, and flow ports 126 extend radially through a sidewall of the poppet valve 124. A spring 127 is disposed in the poppet valve port for biasing the diaphragm 122 away from the intermediate wall 123 toward an open position, in which fluid communication is established between the poppet valve bore 106 and the recess 107.

Figure 6A:
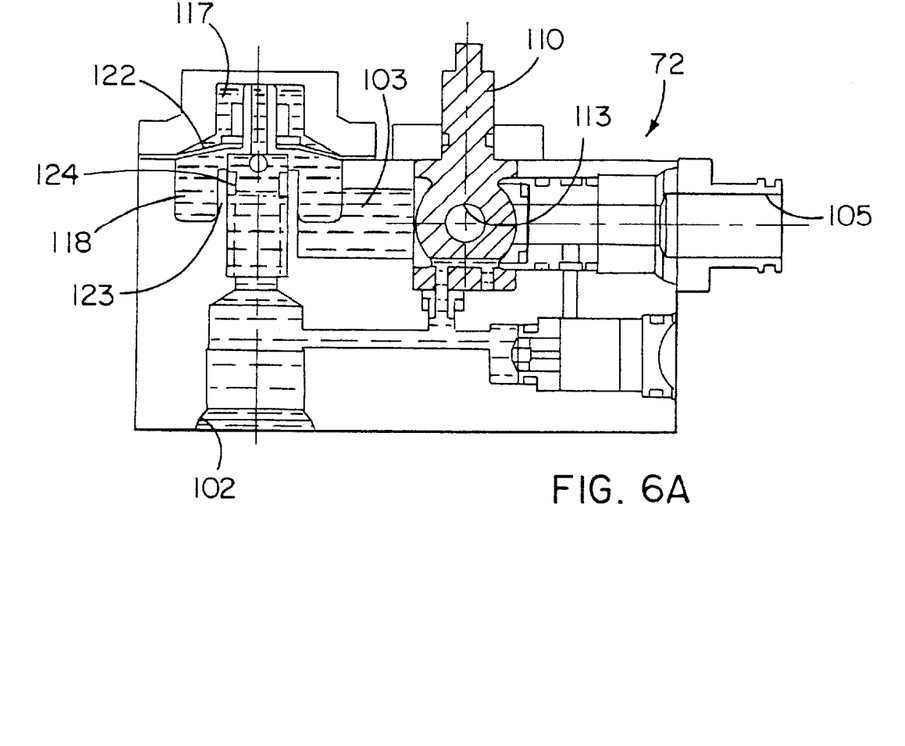
FIGS. 6A–D are side elevation views, in cross-section, of the rinse fluid valve showing the various stages of a rinse cycle.

The fuse valve 120 limits the amount of rinse fluid allowed to flow through the rinse valve 72 when the ball valve 110 is open. During operation, the ball valve 110 is normally in a closed position to prevent flow of rinse fluid through the rinse valve 72. The rinse fluid flows through both the pilot port 125 to register at the pilot chamber 117, and through the flow ports 126 to register in the flow chamber 118. Because there is no rinse fluid flow, the rinse fluid pressure is the same in both the pilot chamber 117 and the flow chamber 118, so that the spring 127 urges the diaphragm 122 and poppet valve 124 to the open position, as shown in FIG. 6A.

Figure 6B:
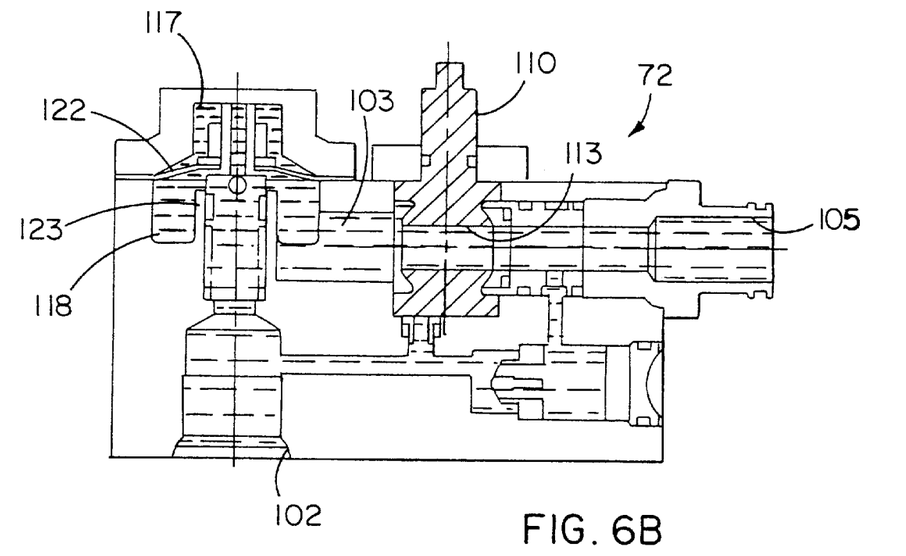
Figure 6C:
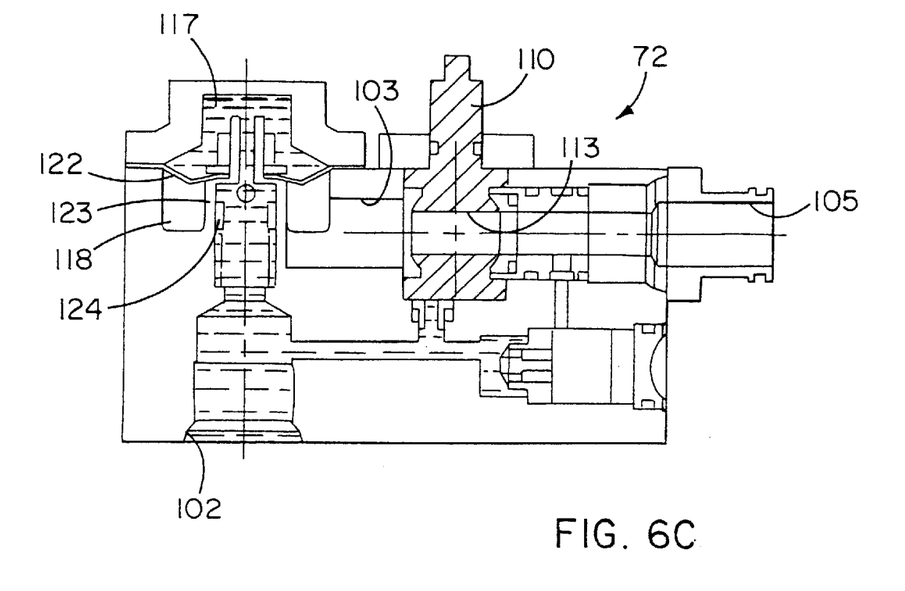

In response to a flush command, the ball valve 110 is rotated to the open position so that the ball valve flow passage 113 communicates the outlet bore 103 to the outlet 105, thereby creating fluid flow through the valve 72 (FIG. 6B). During fluid flow, the rinse fluid experiences a pressure drop as it passes through the flow ports 126, thereby reducing the fluid pressure in the flow chamber 118 while the pressure in the pilot chamber 117 stays substantially the same. The resulting pressure differential across the diaphragm 122 ultimately overcomes the force of the spring 127 SO that the diaphragm 122 and poppet valve 124 move to the closed position, as shown in FIG. 6C. When the diaphragm is in the closed position, fluid flow through the rinse valve 72 is again cut off, this time by the engagement of the diaphragm 122 with the intermediate wall 123. Because of the fuse valve 120, the volume of rinse fluid passing through the open ball valve 110 is substantially constant from flush to flush, regardless of the rinse fluid pressure supplied to the rinse valve 72. It will also be appreciated that the fuse valve 120 provides a redundant shut-off, so that the ball valve 110 or the fuse valve 120 may be used to stop rinse fluid flow should the other fail.

The rinse valve 72 further includes a face valve 130 for returning the diaphragm 121 back to the open position after the ball valve 110 is subsequently closed. Referring to FIG. 5, a bypass bore 131 is formed in the housing block 100 that connects the inlet bore 101 to an auxiliary bore 132. A reset bore 134 intersects the bypass bore 131 and communicates with a ball valve bore 135 formed in the housing block 100. A reset insert 136 is inserted in the reset bore 134 and has a top surface adapted to engage a bottom of the ball valve 110. The ball valve 110 is formed with reset passages 137 extending into the ball valve 110 to a transverse passage 138 extending entirely through the ball valve 110. The reset passages 137 are located on the ball valve 110 so that they align with the reset insert 136 only when the ball valve 110 is in the closed position. The seal 114 prevents rinse fluid from leaking from the transverse passage 138 to the outlet 105. No seal is provided upstream of the ball valve 110 so that, when one of the reset passages 137 is aligned with the insert 136, fluid communication is established from the inlet bore 101, through the bypass and reset bores 131, 134 and one of the reset passages 137 to the flow chamber 118.

According to the illustrated embodiment, the rinse valve 72 also includes a drain valve 133 disposed in the auxiliary bore 132 to provide freeze protection, as is well known in the art.

Figure 6D:
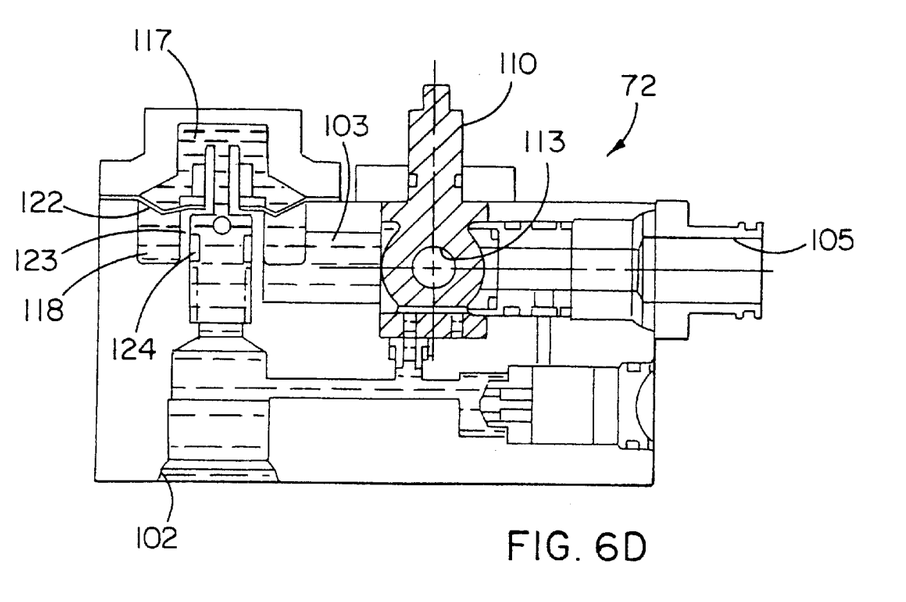

In operation, the diaphragm 121 moves to the closed position while the ball valve 110 is open, thereby stopping rinse fluid flow through the rinse valve 72 (FIG. 6C). With the ball valve 110 in the open position, neither reset passage 137 is aligned with the reset insert 136. The ball valve 110 is subsequently closed, thereby aligning one of the reset passages 137 with the insert 136 and establishing fluid communication from the inlet bore 101 to the flow chamber 118 (FIG. 6D). The incoming rinse fluid pressure registers at the flow chamber 118, so that the flow chamber reaches the same pressure as the pilot chamber 117. With the differential pressure across the diaphragm 121 removed, the spring 127 is again allowed to urge the diaphragm 121 to the open position, thereby resetting the fuse valve 120 to the position shown in FIG. 6A.

In the preferred embodiment, a position sensor is used to provide feedback regarding poppet valve position feedback. In the illustrated embodiment, a magnet 140 is attached to the poppet valve 124, and a hall effect switch 141 is located outside of the bonnet 121 in a switch enclosure 142 attached to the bonnet 121. The hall effect switch 141 provides a signal that varies according to the position of the magnet 140 to indicate the position of the poppet valve 124. The poppet valve position signal may be used for diagnostic purposes such as fault detection by comparing the position signal to the position of the disk 83 or ball valve 110. For example, if the poppet valve 124 does not return to the open position when the ball valve 110 resumes the closed position, a signal may be sent by the FCU to the vehicle indicating a problem with the rinse fluid valve 72.

Figure 7:
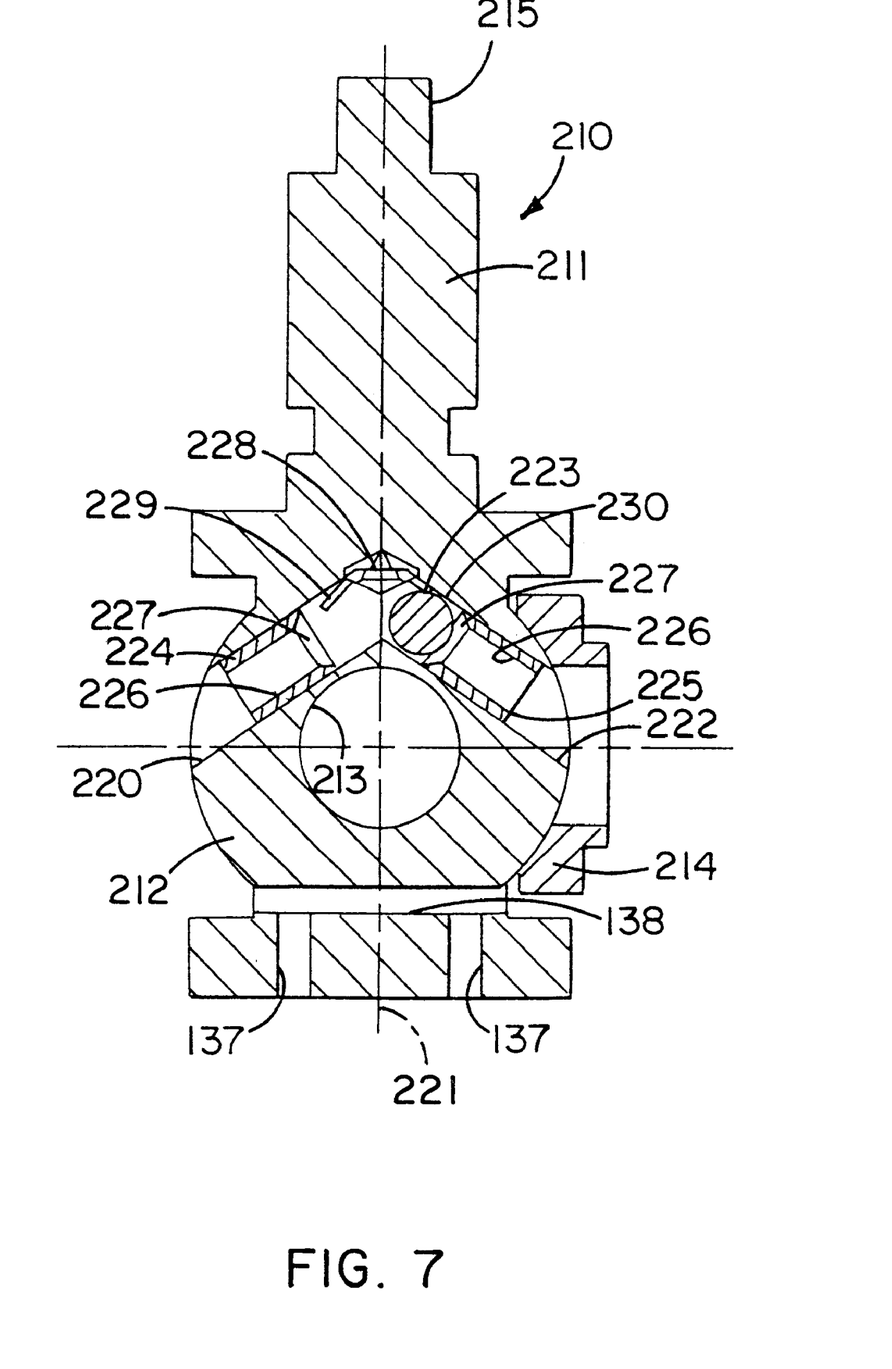
FIG. 7 is an side elevation view, in cross-section, of an alternative embodiment of a ball valve incorporated into the rinse fluid valve.

In an alternative embodiment illustrated at FIG. 7, instead of providing the separate drain valve 133, the freeze protection is incorporated directly into the ball valve 210. The ball valve 210 has a shaft 211 and a valve member 212 with a flow passage 213. A seal 214 is provided for sealing the downstream portion of the valve member 212 from the outlet bore. The ball valve 210 preferably includes a key 215 for engaging the slot 116 formed in the axle end 84a, so that operation of the ball valve 210 is similar to the previous embodiment.

A first angled passage 220 extends from a periphery of the valve member 212 to a center line 221 of the ball valve 210. A second angled passage 222 extends from an opposite portion of the valve member periphery to the same center line 221, so that the second angled passage 222 intersects the first angled passage 220. A ball stop 223 is sized to freely move within the first and second passages 220,222, and first and second sleeves 224, 225 are inserted into the first and second angled passages 220, 222, respectively, and sized to frictionally engage the first and second passages 220, 222, thereby retaining the ball stop 223 within the passages 220,222. With the sleeves 224, 225 in position, the ball stop 223 is free to shuttle therebetween. The sleeves 224,225 each have a central passage 226 and a valve seat 227 formed therein. The valve seats 227 are sized to sealingly engage the ball stop 223 and prevent fluid flow therethrough. A leaf spring 228 is provided with a first arm 229 extending into the first angled passageway 220 and a second arm 230 extending into the second angled passageway 222. The arms 229, 230 urge the ball stop 223 away from the valve seats 227 to allow fluid flow therethrough. When a sufficient fluid pressure acts on the ball stop 223, however, the urging force of the arms 229, 230 is overcome and the ball stop 223 engages one of the seats 227.

In operation, the ball stop 223 is urged by one of the leaf spring arms 229, 230 away from an associated sleeve seat 227 in the absence of rinse fluid flow. When rinse fluid begins to flow, the fluid force overcomes the leaf spring force to drive the ball stop 223 into engagement with one of the sleeve seats 227, thereby preventing fluid flow through the first and second angled passages 220, 222. Once fluid flow subsequently ceases, the fluid force is removed and the spring again urges the ball stop 223 away from the seats 226, thereby allowing air flow through the passages 220, 222.

The FCU 74 comprises a housing 150 attached to the discharge valve housing half 78b opposite the rinse valve 72 (FIG. 3). The housing 150 encloses one or more circuit boards (not shown) for controlling operation of the toilet 10. In addition to the typical inputs and outputs, the FCU 74 also receives feedback from the poppet valve position sensor 141.

The FCU housing 150 further houses a position sensor for determining the position of the disk 83. As best shown in FIG. 4A, magnets 152 are attached to the axle end 84b of the disk 83. The axle end 84b extends into the FCU housing 150, so that the magnets 152 are positioned proximal the control board. Hall effect switches 154 are provided directly on the circuit board for sensing the magnets 152 and thus determining the rotational position of the disk 83. In the illustrated embodiment, a pair of magnets 152 are attached to the axle end 84b, and a pair of hall effect switches 154 are attached to the circuit board. The switches 154 actuate between on and off positions depending on the proximity of the magnets, thereby indicating the position of the disk 83. As a result, the position of the disk 83 is directly sensed rather than inferring disk position based on actuator position. In addition, the switches 154 are located inside the FCU housing 150 and are therefore isolated from contamination due to lubrication or other material.

From the foregoing, it will be appreciated that the rinse valve 72 of the present invention provides a relatively constant volume of rinse fluid to the bowl 36. The use of a ball valve 110 and a fuse valve 120 provides a redundant shut-off in the system in the event one of the valves fails in the open position, thereby preventing constant flow of rinse fluid. The rinse valve also includes a sensor for providing feedback regarding fuse valve position, which may be used to diagnose faults in the valve. In addition, compact freeze protection apparatus is described.

The foregoing detailed description has be given for clearness of understanding only, and no unnecessary limitations should be understood therefrom, as modifications would be obvious to those skilled in the art.

What is claimed is:

1. A rinse fluid valve for use in a vacuum toilet system having a waste receptacle with a rinse fluid dispenser associated therewith and a source of rinse fluid, the rinse fluid valve comprising:
   a housing having an inlet in fluid communication with the rinse fluid source and an outlet in fluid communication with the rinse fluid dispenser;
   a flow path extending from the inlet to the outlet;
   a moveable rinse fluid valve member disposed in the flow path and moveable between open and closed positions; and
   a second valve member disposed in the flow path upstream of the rinse fluid valve and having a normally open position to allow fluid flow therethrough, the second valve member automatically actuating to a closed position after a desired volume of fluid has passed therethrough thereby to cease rinse fluid flow through the flow path.

2. The rinse fluid valve of claim 1, in which the second valve member comprises a pressure sensitive diaphragm disposed between a pilot chamber and a flow chamber formed in the flow path and moveable between an open position and a closed position, and a poppet valve attached to the diaphragm.

3. The rinse fluid valve of claim 2, in which the poppet valve comprises a pilot port in fluid communication with the pilot chamber and a flow port in fluid communication with the flow chamber.

4. The rinse fluid valve of claim 3, in which the flow port is sized to generate a pressure drop greater than that through the pilot port, so that the diaphragm is urged away from the pilot port to the closed position, thereby obstructing the flow path.

5. The rinse fluid valve of claim 2, further comprising a reset valve for returning the diaphragm from the closed position to the open position.

6. The rinse fluid valve of claim 5, further comprising a bypass line having a first end in fluid communication with the inlet and a second end in fluid communication with the flow chamber, wherein the reset valve is disposed between the first and second bypass line ends.

7. The rinse fluid valve of claim 6, in which the reset valve comprises a reset passage formed in the moveable rinse fluid valve member, the reset passage moving with the rinse fluid valve member between an open position, in which the reset passage communicates with the bypass line, and a closed position, in which the reset passage does not communicate with the bypass line.

8. The rinse fluid valve of claim 7, in which the reset passage is located so that the reset passage is in the closed position when the rinse fluid valve member is in the open position, and so that the reset passage is in the open position when the rinse fluid valve member is in the closed position.

9. The rinse fluid valve of claim 1, in which the second valve member comprises a fuse valve.

10. A rinse fluid valve for use in a vacuum toilet system having a waste receptacle with a rinse fluid dispenser associated therewith and a source of rinse fluid, the rinse fluid valve comprising:

a housing having an inlet in fluid communication with the rinse fluid source and an outlet in fluid communication with the rinse fluid dispenser;

a flow path extending from the inlet to the outlet;

a moveable rinse fluid valve member disposed in the flow path and moveable between open and closed positions; and a second valve disposed in the flow path upstream of the rinse fluid valve, the second valve including a second valve member moveable between an open position allowing fluid flow therethrough and an automatically closed position after a desired volume of fluid has passed therethrough to thereby prohibit fluid flow therethrough;

and a position sensor for detecting a position of the second valve member and generating a position signal.

11. The rinse fluid valve of claim 10, in which the second valve member comprises a pressure sensitive diaphragm disposed between a pilot chamber and a flow chamber formed in the flow path and moveable between an open position and a closed position, and a poppet valve attached to the diaphragm.

12. The rinse fluid valve of claim 11, in which the poppet valve comprises a pilot port in fluid communication with the pilot chamber and a flow port in fluid communication with the flow chamber.

13. The rinse fluid valve of claim 12, in which the flow port is sized to generate a pressure drop greater than that through the pilot port, so that the diaphragm is urged away from the pilot port to the closed position, thereby obstructing the flow path.

14. The rinse fluid valve of claim 13, further comprising a reset valve for returning the diaphragm from the closed position to the open position.

15. The rinse fluid valve of claim 11, in which a magnet is attached to the poppet valve and the position sensor comprises a hall effect sensor.

16. The rinse fluid valve of claim 15, in which the hall effect switch is mounted to an exterior of the housing.

17. The rinse fluid valve of claim 10, in which the second valve comprises a fuse valve.

18. A rinse fluid valve for use in a vacuum toilet system having a waste receptacle with a rinse fluid dispenser associated therewith and a source of rinse fluid, the rinse fluid valve comprising:

a housing having an inlet in fluid communication with the rinse fluid source and an outlet in fluid communication with the rinse fluid dispenser;

a flow path extending from the inlet to the outlet; and a moveable rinse fluid ball valve member disposed in the flow path having a flow passage extending therethrough, the valve member moveable between a closed position, in which the flow passage does not communicate with the flow path to prevent fluid flow, and an open position, in which the flow passage is aligned with the flow path to allow fluid flow;

a freeze protection valve formed in the ball valve and having a valve seat and a movable valve member biased away from the valve seat, wherein sufficient fluid flow pressure drives the valve member into engagement with the valve seat.

* * * * *